(12) United States Patent
Skinner

(10) Patent No.: US 7,519,499 B2
(45) Date of Patent: Apr. 14, 2009

(54) PROGRAMMABLE POSITION SENSING SYSTEM WITH A MEMORY COMPONENT

(75) Inventor: Thomas G. Skinner, Bolingbrook, IL (US)

(73) Assignee: Caterpillar Inc., Peoria, IL (US)

( * ) Notice: Subject to any disclaimer, the term of this patent is extended or adjusted under 35 U.S.C. 154(b) by 414 days.

(21) Appl. No.: 11/017,044

(22) Filed: Dec. 21, 2004

(65) Prior Publication Data

US 2006/0136170 A1   Jun. 22, 2006

(51) Int. Cl.
*G08C 21/00*   (2006.01)
*G06F 17/00*   (2006.01)

(52) U.S. Cl. .................. 702/150; 702/152; 340/686.1

(58) Field of Classification Search .......... 702/150–152
See application file for complete search history.

(56) References Cited

U.S. PATENT DOCUMENTS

| | | | | |
|---|---|---|---|---|
| 4,487,181 | A | | 12/1984 | Moore et al. ................. 123/357 |
| 5,469,694 | A | | 11/1995 | Panousheck et al. ....... 56/10.2 E |
| 5,506,502 | A | * | 4/1996 | Maennle ................. 324/207.25 |
| 5,905,215 | A | | 5/1999 | Jin et al. ..................... 73/865.9 |
| 5,918,199 | A | | 6/1999 | Yang et al. .................. 702/150 |
| 6,166,655 | A | * | 12/2000 | Chen et al. ............. 340/870.31 |
| 6,243,023 | B1 | * | 6/2001 | Katagiri ................. 340/870.03 |
| 6,374,191 | B1 | | 4/2002 | Tsuchiya et al. ............. 702/104 |
| 6,509,733 | B2 | | 1/2003 | Blubaugh et al. ....... 324/207.13 |
| 6,609,076 | B2 | | 8/2003 | Schuh et al. .................... 702/99 |
| 6,617,963 | B1 | * | 9/2003 | Watters et al. ............ 340/10.41 |
| 6,676,600 | B1 | | 1/2004 | Conero et al. ................ 600/438 |
| 2001/0001136 | A1 | * | 5/2001 | Aronsson ....................... 702/56 |
| 2002/0000126 | A1 | * | 1/2002 | Barclay ........................ 73/649 |
| 2002/0193924 | A1 | | 12/2002 | Muller .......................... 701/30 |
| 2003/0234353 | A1 | * | 12/2003 | Wiese et al. ................. 250/239 |
| 2005/0076992 | A1 | * | 4/2005 | Metcalf et al. ............ 156/110.1 |
| 2007/0239324 | A1 | * | 10/2007 | Eherman et al. ............... 701/2 |

FOREIGN PATENT DOCUMENTS

EP            1217220 A2  *  6/2002

* cited by examiner

*Primary Examiner*—Hal D Wachsman
(74) *Attorney, Agent, or Firm*—Finnegan, Henderson, Farabow, Garrett & Dunner

(57) ABSTRACT

A programmable position sensing system for monitoring a position of a monitored component movable between a first position and a second position includes a housing associated with the monitored component and a sensor associated with the housing and disposed onboard the monitored component. The sensor is configured to monitor a position of the monitored component. A memory component is associated with the housing and disposed onboard the monitored component. The memory component includes identifying information of the monitored component stored therein. A processor is associated with the housing and in communication with the sensor and the memory component.

31 Claims, 5 Drawing Sheets

PROGRAMMABLE POSITION SENSING SYSTEM WITH A MEMORY COMPONENT

TECHNICAL FIELD

This application is directed to a position sensing system and more particularly, to a position sensing system associated with a memory component.

BACKGROUND

Sensors are often used to monitor the position of one component relative to another. For example, a linear position sensor may be used to monitor the amount of extension of a hydraulic or pneumatic cylinder associated with a digging linkage. In another example, a rotary position sensor may be used to determine a pivot position, such as the amount of pivot of a control lever on the work machine.

Output signals of different sensors may vary for the same input. Additionally, output signals of a sensor can vary depending on its associated component. Accordingly, sensors should be calibrated in order to give a proper reading of the position of the monitored component. When used to monitor the extension of a cylinder, calibration may require that the cylinder be extended to a first position and a measurement taken of the sensor signal at the first position. Then, the cylinder may be retracted to a second position and a measurement taken of the sensor signal at the second position. By knowing the actual cylinder length at the first and second positions, and by knowing the signal output at the first and second positions, a linear scale or mapping may be used to determine the position of the cylinder for any given signal from the sensor.

Sometimes, the calibration process for a cylinder may occur at a cylinder manufacturing facility before the cylinder is installed on a work machine. The calibration information may be stored in a database. The cylinder and sensor then may be shipped to a work machine assembly plant, and the calibration information in the database may be sent separately, possibly via electronic means. Later, when the cylinder and sensor are to be installed on the work machine, the proper calibration information for the proper cylinder and sensor must be located and transferred to a control module on the work machine. However, such a system provides opportunities for error.

For example, it is possible that calibration information for one cylinder may be confused with calibration information from another cylinder. Accordingly, incorrect information may be uploaded to the control module on the work machine. If this occurs, the work machine does not have the proper calibration information for the cylinder and senor.

One known system for maintaining calibration information with a sensor is disclosed in U.S. Pat. No. 6,374,191 to Tsuchiya et al. The '191 patent discloses a pressure sensor that includes a memory and processor for determining calibration values. However, the pressure sensor does not store information specific to any system or component where it ultimately will be used. Therefore, the disclosed pressure sensor may not be usable in an environment where positions and/or displacement of a physical component are considered for proper calibration.

The disclosed system is directed to a position sensor that may overcome one or more of the deficiencies of the prior art.

SUMMARY OF THE INVENTION

In one aspect, a programmable position sensing system for monitoring a position of a monitored component movable between a first position and a second position is disclosed. The programmable position sensing system may include a housing associated with the monitored component and a sensor associated with the housing and may be disposed onboard the monitored component. The sensor may be configured to monitor a position of the monitored component. A memory component may be associated with the housing and may be disposed onboard the monitored component. The memory component may include identifying information of the monitored component stored therein. A processor may be associated with the housing and may be in communication with the sensor and the memory component.

In another aspect, a method of employing a sensing system for monitoring a position of a monitored component is disclosed. The method may include monitoring a position of the monitored component and generating identifying information for the monitored component. The identifying information may be stored in a memory component disposed onboard the monitored component. The identifying information may be accessed with a processor disposed onboard the monitored component.

DETAILED DESCRIPTION

Reference will now be made in detail to exemplary disclosed embodiments, which are illustrated in the accompanying drawings. Wherever possible, the same reference numbers will be used throughout the drawings to refer to the same or like parts.

Figure 1:
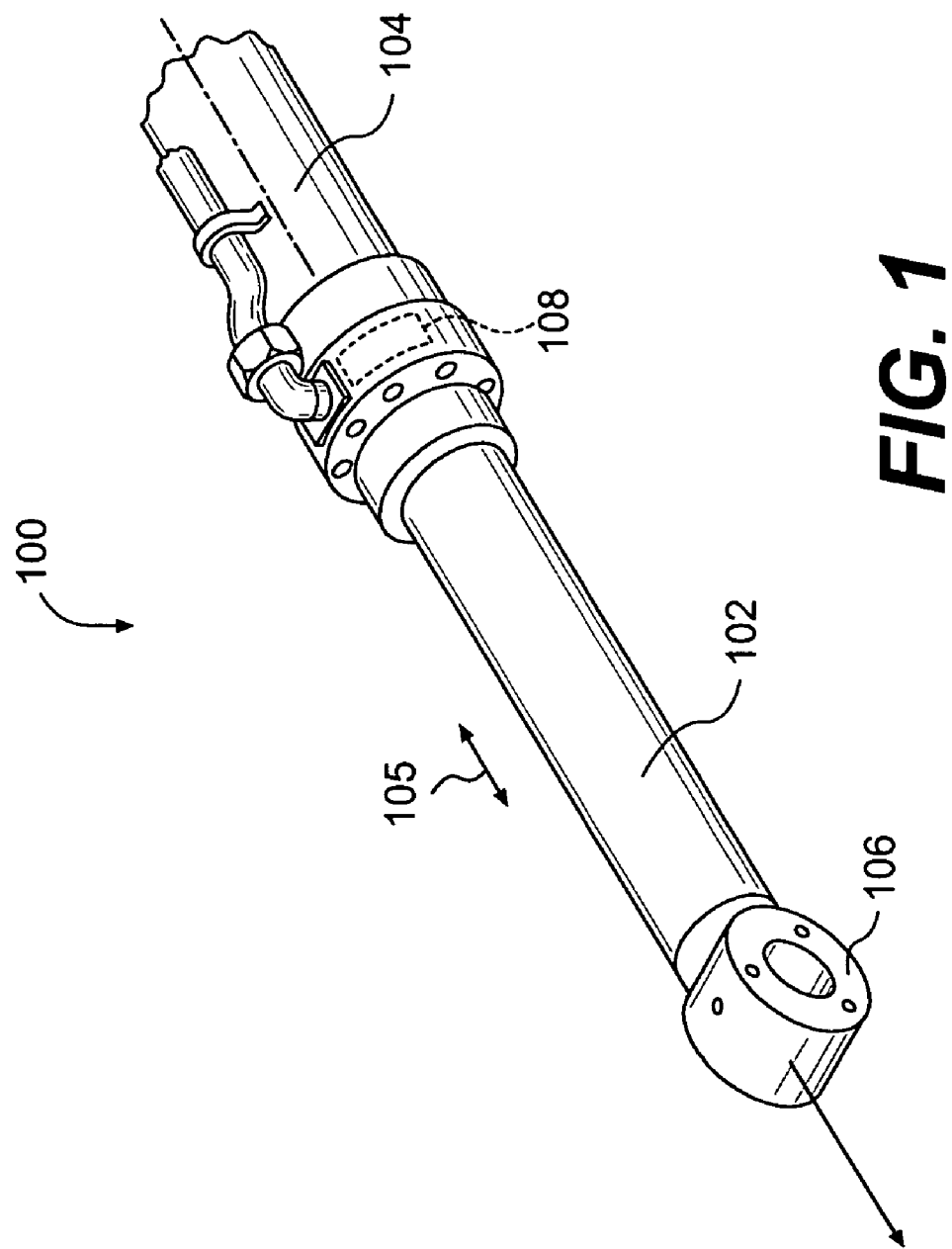
FIG. 1 is a pictorial representation of an exemplary cylinder actuator.

FIG. 1 illustrates an exemplary embodiment of a monitored component 100. In the exemplary embodiment shown, the monitored component 100 is an extendable cylinder. The cylinder may be used as a hydraulic cylinder that may extend or retract to operate linkages and/or implements on a work machine, such as an earth moving machine. However, the monitored component 100 may be any component whose position and/or displacement is monitored by a position sensor. For example, the monitored component could be any component that may change its position, such as, for example, by extending, retracting, and/or by pivoting about a pivot point. Accordingly, the monitored component may be, for example, the cylinder shown, a swing frame, a lever, a pivoting pedal, or other component. As used herein, the term position sensor and the term displacement sensor are used interchangeably, but the claims are intended to cover both position and displacement sensors.

In the exemplary embodiment shown, the monitored component 100 may include an extendable portion, such as rod 102 associated with and extendable relative to a body 104. Together, the rod 102 and the body 104 may define a longitudinal axis 105. The monitored component 100 may be operable to extend and retract the rod 102 into the cylinder body 104, typically along a linear path of movement represented by the directional arrow 107. The body 104 may be a hollow body configured to house the rod 102 and also to receive fluid or other means for extending and retracting the rod 102 relative to the body 104.

An eyelet 106 may be attached at each end of the monitored component 100. FIG. 1 shows the eyelet 106 attached to the rod 102, but does not show the eyelet attached to the body 104. The eyelet 106 allows the rod 102 and body 104 to connect to other components, such as linkages. In one embodiment, the eyelet 106 is configured to receive a pin (not shown) to attach to a linkage on a work machine.

The rod 102 and the body 104 may be designed with a particular bore diameter, rod diameter, and nominal stroke. The diameters and stroke length for any given monitored component 100 may have been selected based on design requirements, expected applied loads, and a desired life, among other factors.

The monitored component 100 may include an onboard sensing system 108 configured to sense a position and/or displacement of the monitored component and configured to store information regarding the monitored component 100. The stored information may include identifying information specific to the monitored component 100, including calibration information. In addition, the sensing system 108 may include computer program as executable code, and/or other information. In the exemplary embodiment shown, the sensing system 108 is configured to monitor the amount of extension of the rod 102 relative to the body 104.

The sensing system 108 may be disposed onboard the monitored component 100. In the exemplary embodiment shown in FIG. 1, the sensing system 108 is disposed within the body 104 of the monitored component 100. In this embodiment, where the monitored component is an extendable cylinder, the sensing system 108 is shown in a gland area. However, the sensing system 108 may be included in or on other areas of the monitored component 100, including, for example, a cylinder cap area (not shown) or other area. It should be noted that the sensing system 108 may be disposed outside of the monitored component 100 and may include a separate housing connected to an exterior of the monitored component 100.

Figure 2:
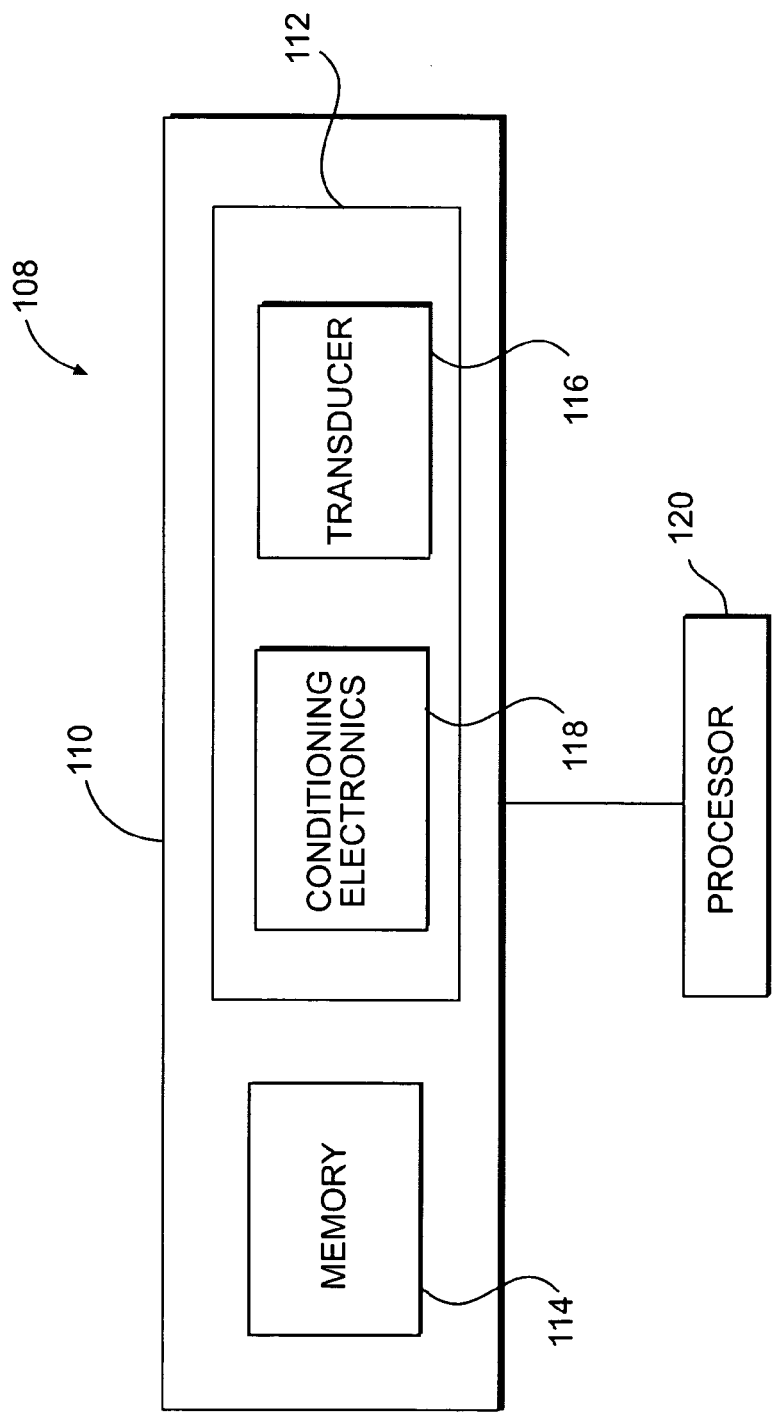
FIG. 2 is a block diagram of one embodiment of a programmable position sensor.

FIG. 2 shows one exemplary embodiment of the sensing system 108 and a processor 120. The sensing system 108 may include a housing 110 that may contain a sensor 112 and a memory component 114. The sensor 112 and the memory component 114 each may be in communication with the processor 120. The housing 110 may include a single or multiple chambers for the sensor 112 and the memory component 114 and, in the event of multiple chambers, each may be disposed onboard the monitored component 100. In one embodiment, the housing 110 may be the housing of the monitored component 100, such as the body 104. In another embodiment, the housing 110 may be disposed inside the monitored component 100, such as inside the body 104. Alternatively, the housing 108 may be disposed outside the monitored component 100, and may be physically connected to and/or associated with the monitored component 100.

The sensor 112 may include a transducer 116 and conditioning electronics 118. The transducer 116 may be configured to convert energy to generate a signal that may be indicative of a position and/or displacement of an element of the monitored component 100, such as, for example, the rod 102. The transducer 116 may be, for example, an encoder, such as a linear, an optical, or rotary encoder. However, the transducer 116 may be of other known types including, for example, resistive, magetorestrictive, and magnetostrictive, among others. The conditioning electronics 118 may receive a signal from the transducer 116 and may filter or condition the signal so that it may be interpreted and converted to usable data. Using the transducer 116 and the conditioning electronics 118, the sensor 112 may be configured to monitor linear and/or rotary movement of the monitored component 100, for example.

The memory component 114 may be configured to store identifying information specific to the monitored component 100. In one exemplary embodiment, the memory component 114 is hard-coded with the identifying information. In another exemplary embodiment, the memory component 114 is over-writeable. Although the memory component may be hard-coded or over-writeable, as desired, hard-coded information may be useful for unchanging information, such as a serial number. In contrast, an over-writeable memory component 114 may be useful when the monitored component 100 and/or the sensor 112 is repaired, which may change certain parameters.

In one exemplary embodiment, the identifying information may include calibration information. For example, when the monitored component 100 is an extendable cylinder, the calibration information may include a pin-to-pin measurement at a first position and a pin-to-pin measurement at a second position. The first and second positions may be a fully extended position and a fully retracted position of the monitored component 100, respectively. In addition, the memory component 114 may include stored data indicative of a sensor output signal from the sensor 112 at the first and second positions.

In addition to calibration information, the identifying information in the memory component 114 may include an identifying code, such as, for example, a serial number. This may also include an identifying code for the sensor 112. Because the identifying information in the memory component 114 is maintained onboard the monitored component 100, tracking the information may be simply accomplished. Further, because the memory component 114 may include identifying information for the monitored component 100, concerns about tracking and downloading correct information may be diminished. Additionally, the memory component 114 may configured to store parameters of the monitored component 100 and/or operating characteristics, such as, for example, bore diameter, rod diameter, and nominal stroke, among others.

In one exemplary embodiment, the memory component 114 may be configured to store an instruction map, such as a snubbing map, therein that may include information regarding the relationship between the velocity of movement of the monitored component 100 and its position. The stored instruction map may provide data to an electronic control module configured to control a valve that may control movement of the monitored component 100. For example, the instruction map may provide data to reduce the movement velocity of the monitored component 100 as the monitored component 100 approaches a limit of its movement. In some exemplary embodiments, where the monitored component is a pedal, the instruction map may indicate a predesignated location in the pedal range of movement for neutralizing a transmission or activating a brake. The instruction map also may be used with other monitored components such as, for example, a lever.

In one exemplary embodiment, the memory component 114 is configured to store one or more threshold velocity values. The processor 120 may count the number of times that the stored velocity threshold is exceeded. For example, the memory component may store velocity thresholds of 200 mm/second, 300 mm/second, and 400 mm/second. The processor 120 may then count the number of times that the calculated velocity exceeds one of the thresholds. Data representing the counted times may then be stored in the memory component 114. The processor 120 and memory component 114 may be configured to output the information as diagnostic information for analysis by an operator, a mechanic, or others.

In one exemplary embodiment, the memory component 114 may be configured to store information such as the distance traveled over the life of the monitored component 100 and/or the distance traveled since the monitored component 100 and/or a subcomponent of the monitored component 100 was last serviced. For example, the sensor 112 may monitor the movement distance of the monitored component 100 and the processor 120 may sum the distance and update or store the distance in the memory component 114. Accordingly, at any time, an operator, mechanic, or other person may access the distance traveled information through the processor 120. In some instances, the information may be accessed through a controller or a communication link or diagnostic or service tool.

In another exemplary embodiment, the memory component 114 may be configured to store the number of times the direction of movement changed over the life of the monitored component 100. In yet another exemplary embodiment, the memory component 114 may store the number of times the direction has changed since the monitored component was last serviced. Again, the sensor 112 may monitor the movement of the monitored component 100 and the processor 120 may sum the direction changes and update or store the number of times in the memory component 114. In yet another exemplary embodiment, the memory component may be configured to store information regarding the number of hours of operation of the monitored component during its life and/or since its most recent servicing. The number of hours may be referred to herein as hour meter information.

The processor 120 may be associated with the sensor 112 and the memory component 114 and may be configured to receive and interpret sensor signals indicative of the position and/or displacement of the monitored component 100. Further, the processor may be configured to access data and calculation processes, such as algorithms, stored on the memory component 114. Using the data on the memory component 114, along with the signals from the sensor 112, the processor 120 may be configured to perform calculations and processes regarding the position and/or displacement of the monitored component 100. For example, using the information from the sensor 112 and the information in the memory component 114, the processor 120 may be configured to compute absolute distances, position, length, velocity, and acceleration of the monitored component 100.

Furthermore, by using the identifying information, including the calibration information stored in the memory component 114, the processor 120 may be able to accurately identify and determine the position of the monitored component 100 for any given sensor signal. Accordingly, the sensing system may be selectively connected with various processors that, when provided access to the memory component 114, may accurately identify and determine the position and/or displacement of the monitored component 100, such as the extension amount of the rod 102 relative to the body 104.

In the exemplary embodiment shown in FIG. 2, the processor 120 is disposed apart from the sensing system 108. However, in other exemplary embodiments, the processor 120 is disposed onboard the monitored component 100, and therefore, may form a part of the sensing system 108.

Figure 3:
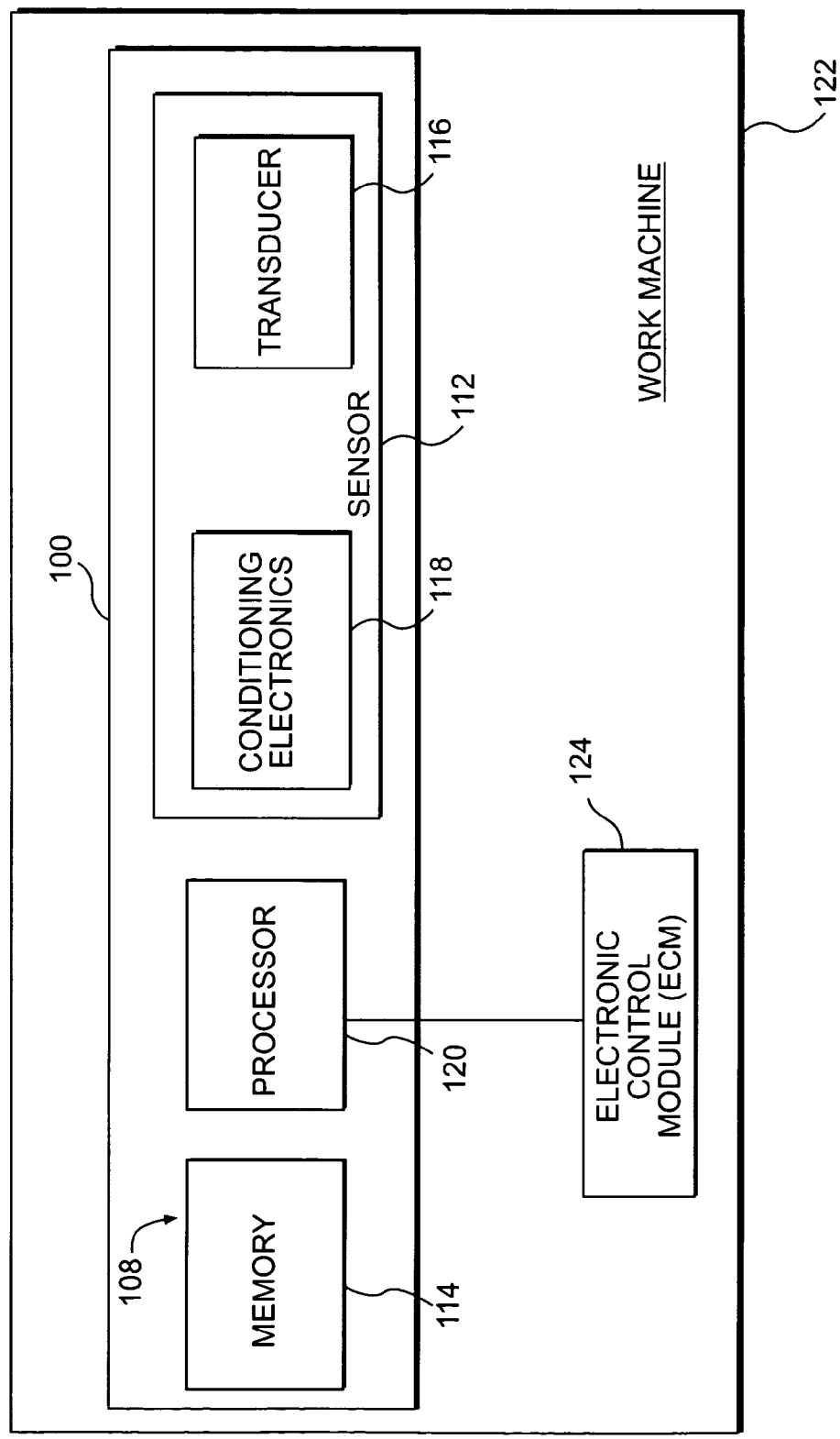
FIG. 3 is a block diagram of another embodiment of a programmable position sensor.

FIG. 3 is a block diagram including another exemplary embodiment of a sensing system 108. In FIG. 3, the sensing system 108 is disposed onboard the monitored component 100, and the monitored component 100 is operably disposed on a mechanical device, such as, for example, a linkage on a work machine 122.

The sensing system 108 of FIG. 3 differs from the sensing system 108 of FIG. 2 because the processor 120 is also disposed onboard the monitored component 100, thereby forming a part of the sensing system 108. Further, in this exemplary embodiment, the sensing system 108 may be disposed within the monitored component 100, so that the monitored component 100 may operate as a housing for the sensing system 108. Accordingly, a separate housing, such as the housing 110 in FIG. 2, may be redundant.

The processor 120 may be in communication with both the sensor 112 and the memory component 114 to perform the functions described above. Therefore, based on processes and data in the memory component 114, the processor 120 may be configured to perform onboard calculations and make determinations about the monitored component 100. In one exemplary embodiment, the processor 120 may be configured to compute acceleration, velocity, and other information described above, based on the processes and information stored in the memory component 114.

The work machine 122 may include an electronic control module (ECM) 124 that may be used to control an aspect or component of the work machine 122, receive input signals initiated by an operator, and/or perform other functions. In one exemplary embodiment, the ECM 124 is a main control module used to control the work machine 122. In other exemplary embodiments, the ECM 124 is a lower level control module, that may control one or more components or assemblies on the work machine 122. Examples of lower level control modules may include a valve control module, a cylinder control module, a brake control module, a linkage control module, among others. In these exemplary embodiments, the ECM 124 may be in communication with one or more additional control modules. In addition, the ECM 124 is in communication with the sensing system 108 on the monitored component 100. The ECM 124 may communicate with the processor 120 to receive processed information and data. By receiving processed data from the processor 120 instead of raw data from the sensor 112, the amount of processing performed by the ECM 124 may be reduced. This may free the ECM 124 to perform additional processing or other functions relating to operation of the work machine 122. Further, because the amount of processing performed by the ECM 124 is reduced, the cycle speed of the ECM 124 may be increased. Accordingly, there may be reduced lag times when the processor 120 is associated with the monitored component 100 and performs calculations.

It should be noted that the sensing system 108 disclosed in FIG. 2 may be substituted with the sensing system 108 in FIG. 3. In such an embodiment, the ECM 124 would perform any required processing and would be in communication with the sensor 112 and the memory component 114. In addition to storing information about the monitored component 100, in one exemplary embodiment, the memory component 114 is configured to store identifying information relating to its environment, such as a serial number of the work machine 122 with which the monitored component 100 is associated. In addition, the memory component 114 may be configured to store identifying information such as a code identifying a subassembly of the work machine 122, such as a cab, a linkage, or other associated subassembly. The identifying information may include, for example, a machine number or other code identifying the environment where the monitored component 100 is being used.

In one exemplary embodiment (not shown), the monitored component 100 is a pivoting component, such as a foot pedal, a lever, or other pivoting component. In this embodiment, the sensor 112 is a pivot position or rotational displacement sensor that may be associated with a pin or other connection. The memory component 114 may operate as described above to store identifying information about the monitored component. Accordingly, the memory component 114 may store specific information regarding the monitored component and/or the position sensor. For example, the memory component 114 may store data representative of the sensor output signal from the sensor 112 when the monitored component is pivoted to both a first position and a second position. In addition, the memory component 114 may store data representative of the actual location of the first and second positions, including the angle between the first and second positions. Based on this information, the processor 120 and/or the ECM 124 may be configured to determine information regarding operation of the monitored component, as described above.

In one exemplary embodiment, the sensing system 108 is configured to communicate data and information stored on the memory component 114 to the ECM 124 for backup storage. Then, if any element of the sensing system 108 were to fail or to be replaced, the data and information stored on the ECM 124 may be restored to the sensing system 108. The data may be communicated to the ECM 124 at any desired time, including, for example, once a day. In another exemplary embodiment, the data may be communicated only once, when the sensing system 108 is initially connected with the ECM 124.

Although the memory component 114 is described as storing data representative of the sensor output when the monitored component is at both a first and a second position, the memory component also may be used to store data representative of an output signal when the monitored component is at a single position. Based upon the stored single position data, a processor may be configured to estimate any position of the monitored component. For example, the memory component may also store a mapping ratio, where the position is estimated based on the change in signal from the stored position data.

INDUSTRIAL APPLICABILITY

The present disclosure describes an onboard sensing system 108 that may be associated with the monitored component 100 such as, for example, an extendable cylinder, a rotating lever, a pedal, valve stem, or telehandler boom, among others. The onboard sensing system 108 may be configured to monitor the position and/or displacement of the monitored component 100 and, in addition, store information that is specific to the monitored component 100.

The sensing system 108 may receive information and/or data regarding the monitored component 100 before being sent to a final destination.

For example, while at the manufacturing facility, the monitored component 100 and the sensor 112 of the sensing system 108 may be calibrated, and the calibration information may be stored in the memory component 114 of the sensing system 108. In addition, other identifying information specific to the monitored component, such as an identifying code, parameters, and other information may be stored in the memory component 114. When the monitored component 100 is shipped to a final destination, such as a work machine assembly plant, the sensing system 108, with its stored identifying information, is physically shipped with the monitored component 100. Therefore, the identifying information, including the calibration information, is physically maintained with the monitored component 100.

Because the monitored component 100 is physically associated with its identifying information, including the calibration information, calibration of the monitored component during assembly of the work machine 122 may be no longer necessary. Instead, the sensing system 108 may be merely placed in communication with the ECM 124.

One exemplary method 400 of employing a sensing system for monitoring a position of the monitored component 100 will now be described. The method begins at a start step 402. At a step 404, the monitored component 100 may be assembled using methods known in the art. At a step 406, the sensing system 108 is associated with the monitored component 100. In the exemplary embodiment shown, where the monitored component 100 is a cylinder, the sensing system 108 may be associated with the rod 102 and body 104 to monitor the extension and retraction. Associating the sensing system 108 may include attaching the sensing system so that it is onboard the monitored component 100.

At a step 408, information specific to the monitored component may be uploaded or otherwise transferred to the memory component 114 of the sensing system 108. The information may include an identification code for the monitored component 100, which may be a serial number or other identifying code. In one exemplary embodiment, the identification code of the sensor is stored in the memory component. In addition, physical parameters of the monitored component may be transferred. When the monitored component is a cylinder, these parameters may include rod diameter, bore diameter, and nominal stroke, among other parameters. Further, operating limits and constraints of the monitored component may be transferred to the memory component. For example, the operating limits and constraints may be, for example, a maximum recommended velocity and a maximum recommended acceleration, among others.

At a step 410, the monitored component 100 may be controlled to generate and store additional identifying information, such as calibration information. This may include detecting a sensor signal from the sensor 112 when the component is at a first position. In one exemplary embodiment, the first position is a limit-of-movement position, such as a fully extended position when the monitored component is the cylinder. However, the first position could be other positions. The data representing the location of the first position may be stored in the memory component 114. In addition, data representing the sensor output signal may be stored in the memory component 114. It should be noted that the position data may include distances or other data, such as a pin-to-pin distance at the first position.

The monitored component 100 may then be displaced to a second position. The second position also may be a limit-of-movement position. Thus, when the monitored component is the cylinder, the second position may be a fully retracted position. However, the second position could be some other position. Data representing the location of the second position may be stored in the memory component 114. For example, when the monitored component is the cylinder, the position data may include a pin-to-pin measurement of the cylinder when at the second position. Finally, data representing the sensor output signal at the second position may be stored in the memory component 114.

It should be noted that the processor 120 and/or the ECM 124 may consider the output signals at the first and second positions, along with the measured locations of the first and second positions, to extrapolate and determine a component position at any given sensor signal.

The monitored component 100, along with the associated sensing system 108, may then be packaged and shipped to a work machine assembly facility. At that facility, and at a step 412, the monitored component 100 may be operably installed on the work machine 122 in a manner known in the art. The sensing system 108, including the memory component 114, may then be associated with the ECM 124 on the work machine 122. At a step 414, the information stored in the sensing system 114 may be accessed and used by the ECM 124 to perform processing and to determine the position of the monitored component 100. Accordingly, based on information in the memory component 114, the ECM 124 may fully monitor the position, such as the extension amount, of the monitored component 100. Therefore, without any need to upload any additional information to the ECM 124, the monitored component 100 may be calibrated and operable with the work machine 122. The method ends at a step 416.

An exemplary method 500 of further employing the sensing system 108 will now be described with reference to FIG. 5. This exemplary method may employ the processor 120 which, in this embodiment, may be disposed onboard the monitored component 100 and may form a part of the sensing system 108.

Figure 4:
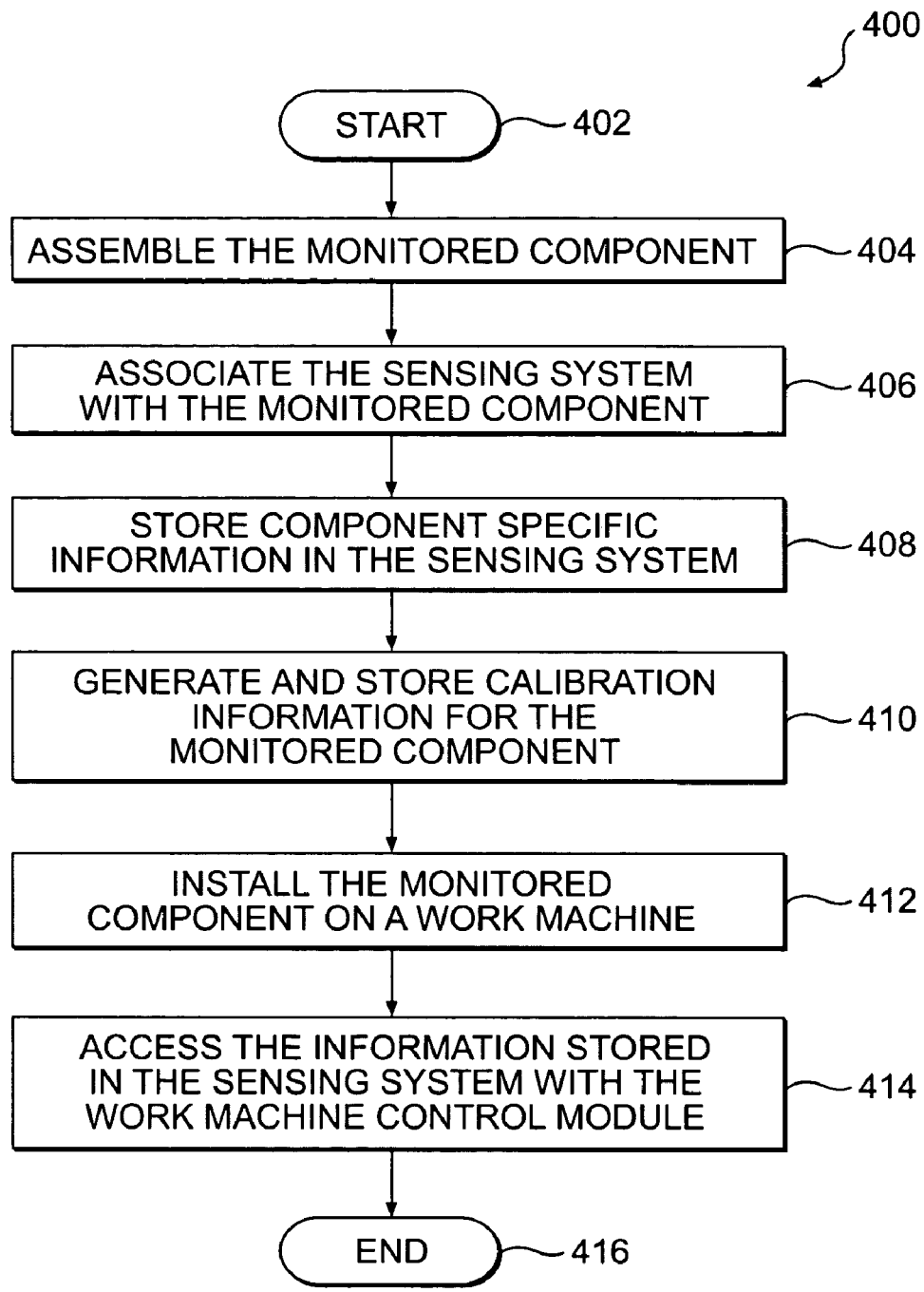
FIG. 4 is a flow chart showing an exemplary method of employing a sensing system.
Figure 5:
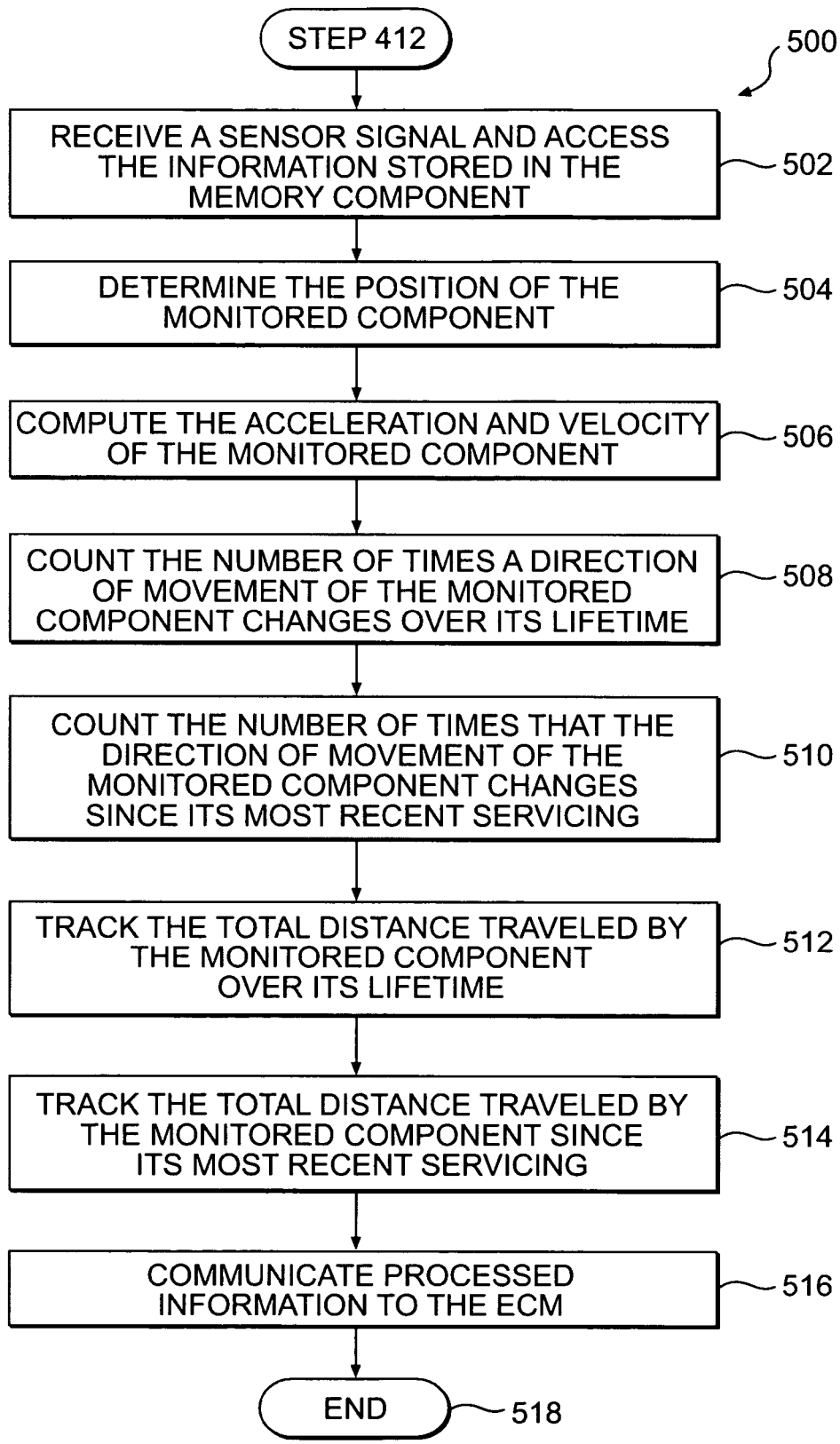
FIG. 5 is a flow chart showing another exemplary method for employing the sensing system.

With reference to FIG. 5, the method begins at step 412 from FIG. 4, which includes installing the monitored component on the work machine 122. At a step 502, the processor 120 receives a sensor signal from the sensor 112 and accesses processes, in the form of computer code and/or other information or data, from the memory component 114. At a step 504, the processor 120 determines the position of the monitored component 100 based on the sensor signal and the information in the memory component 114. At a step 506, the processor calculates the velocity and/or acceleration of the monitored component. This may be accomplished using the change in the sensor signal over a period of time.

In one exemplary embodiment, the memory component 114 stores one or more threshold velocity values and the processor 120 counts the number of times that the stored threshold is exceeded. For example, the memory component may store velocity thresholds of 200 mm/second, 300 mm/second, and 400 mm/second. The processor 120 may then count the number of times that the calculated velocity exceeds one of the thresholds. Data representing the counted times may then be stored in the memory component 114. The processor 120 and memory component 114 may be configured to output the information as diagnostic information for analysis by an operator, a mechanic, or others. In one exemplary embodiment, the processor 120 and memory component 114 generate a histogram showing the number of times that each threshold is exceeded. This information may be used when predicting life expectancy of the monitored component 100.

At a step 508, the processor 120 counts the number of times a direction of movement of the monitored component changes over its lifetime. At a step 510, the processor 120 may count a number of times that the direction of movement of the monitored component 100 changed since its most recent servicing. The counts may be continuously monitored, updated, and stored in the memory component 114. At a step 512, the processor 120 may track the total distance traveled by the monitored component over its lifetime. At a step 514, the processor 120 may track the total distance traveled by the monitored component 100 and/or subcomponents since its most recent servicing. The total distance may be stored within the memory component 114. The information about the number of times the direction of movement changed and the total distance traveled may be used to estimate the amount of wear experienced by the monitored component 100. From this, an operator may estimate the remaining useful life of the monitored component 100 and/or the remaining useful life of specific elements of the monitored component 100.

At a step 516, the processor 120 may communicate processed information to the ECM 124. By performing processing onboard the monitored component 100, and providing processed data, such as values to the ECM 124, the overall amount of calculations that must be performed by the ECM 124 may be reduced. This may allow the ECM 124 to more quickly process other information from other components on the work machine 122. Further, by providing information to the ECM 124, the ECM may be configured to determine an expected useful life of elements of the monitored component. In one exemplary embodiment, this information may be communicated to an operator or mechanic by the ECM 124. The method ends at a step 518.

Although the system and methods herein are described primarily with reference to the monitored component being an extendable cylinder, the system and methods herein are equally applicable to any component, including those whose positions may be monitored by rotary sensors. For example, the system and methods may be applicable to a rotating lever, a pedal, valve stem, a telehandler boom, among others. Further, the monitored component need not be a component for a work machine, but could be any component whose position may be changed.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A programmable position sensing system for monitoring a position of a monitored component movable between a first position and a second position, comprising:
    a housing associated with the monitored component;
    a sensor associated with the housing and disposed onboard the monitored component and configured to monitor a position of the monitored component;
    a memory component associated with the housing and disposed within the monitored component, the memory component including identifying information of the monitored component stored therein; and
    a processor associated with the housing and in communication with the sensor and the memory component.

2. The programmable position sensing system of claim 1, wherein the identifying information includes data representative of a first position of the monitored component and an associated first signal from the sensor.

3. The programmable position sensing system of claim 2, wherein the identifying information further includes data representative of a second position of the monitored component and an associated second signal from the sensor.

4. The programmable position sensing system of claim 1, wherein the identifying information includes an identification code of the monitored component.

5. The programmable position sensing system of claim 1, wherein the identifying information includes physical parameters of the monitored component.

6. The programmable position sensing system of claim 1, wherein the identifying information includes identifying information for the sensor.

7. The programmable position sensing system of claim 1, wherein the sensor includes a transducer configured to measure at least one of linear and rotational displacement.

8. The programmable position sensing system of claim 1, wherein the memory component includes stored information regarding the number of times that at least one of a velocity and an acceleration of the monitored component has exceeded a preset threshold.

9. The programmable position sensing system of claim 1, wherein the memory component includes stored processes configured to compute at least one of a movement velocity and a movement acceleration of the monitored component.

10. The programmable position sensing system of claim 1, wherein the memory component includes stored processes configured to count at least one of:
- a number of times a direction of movement of the monitored component changed over the life of the monitored component or a subcomponent of the monitored component;
- a number of times a direction of the monitored component changed since the most recent servicing of the monitored component or a subcomponent of the monitored component; and
- a number of hours of use of the monitored component or a subcomponent of the monitored component.

11. The programmable position sensing system of claim 1, wherein the memory component includes stored processes configured to track at least one of:
- a total distance traveled by the monitored component over the life of the monitored component or a subcomponent of the monitored component; and
- a total distance traveled by the monitored component since the most recent servicing of the monitored component or a subcomponent of the monitored component.

12. The programmable position sensing system of claim 1, wherein the memory component includes a stored instruction map configured to provide data for a response when the monitored component reaches a predesignated position.

13. A method of employing a sensing system for monitoring a position of a monitored component, comprising:
- monitoring a position of the monitored component;
- generating identifying information for the monitored component;
- storing the identifying information in a memory component disposed onboard the monitored component; and
- accessing the identifying information stored in the memory component with a processor disposed within the monitored component.

14. The method of claim 13, wherein the identifying information includes data representative of a first position of the monitored component and an associated first signal from a sensor.

15. The method of claim 14, wherein the identifying information further includes data representative of a second position of the monitored component and an associated second signal from the sensor.

16. The method of claim 15, wherein generating identifying information includes:
- detecting the first signal from the sensor when the monitored component is located at the first position;
- moving the monitored component to the second position; and
- detecting the second signal from the sensor when the monitored component is located at the second position.

17. The method of claim 16, wherein generating identifying information further includes storing the actual distance between the first and second positions in the memory component.

18. The method of claim 16, wherein the monitored component is a cylinder actuator and the first position is a fully extended position and the second position is a fully retracted position.

19. The method of claim 16, wherein the monitored component is configured to rotate about a pivot point and wherein the angle between the first position and the second position is stored within the memory component.

20. The method of claim 13, including operably assembling the monitored component onto a mechanical device after storing calibration information.

21. The method of claim 20, including accessing the stored identifying information with an electronic control module disposed on the mechanical device.

22. The method of claim 13, including storing an identification code of the monitored component or a subcomponent of the monitored component.

23. The method of claim 13, including storing physical parameters of the monitored component.

24. The method of claim 13, including storing operating parameters of the monitored component.

25. The method of claim 13, including storing identifying information for a sensor.

26. The method of claim 13, including storing an instruction map configured to provide data for a response when the monitored component reaches a predesignated position.

27. The method of claim 13, including storing identifying information for at least one of an associated work machine and an associated subassembly of the work machine.

28. The method of claim 13, wherein generating identifying information includes measuring at least one of distance and rotation.

29. The method of claim 13, including computing at least one of a movement velocity and a movement acceleration of the monitored component with the onboard processor.

30. The method of claim 13, including at least one of:
- counting with the onboard processor, a number of times a direction of movement of the monitored component changed over the life of the monitored component or a subcomponent of the monitored component; and
- counting with the onboard processor, a number of times a direction of the monitored component changed since the most recent servicing of the monitored component or a subcomponent of the monitored component; and
- tracking a number of hours of use of the monitored component or a subcomponent of the monitored component.

31. The method of claim 13, including at least one of:
- tracking with the onboard processor, a total distance traveled by the monitored component over the life of the monitored component or a subcomponent of the monitored component; and
- tracking with the onboard processor, a total distance traveled by the monitored component since the most recent servicing of the monitored component or a subcomponent of the monitored component.

* * * * *